(12) United States Patent
Shibata

(10) Patent No.: US 9,501,933 B2
(45) Date of Patent: Nov. 22, 2016

(54) RADIO DEVICE

(71) Applicant: Panasonic Intellectual Property Management Co., Ltd., Osaka (JP)

(72) Inventor: Teppei Shibata, Gifu (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/676,719

(22) Filed: Apr. 1, 2015

(65) Prior Publication Data
US 2015/0294568 A1   Oct. 15, 2015

(30) Foreign Application Priority Data

Apr. 14, 2014 (JP) ................................. 2014-082627

(51) Int. Cl.
*G08G 1/16* (2006.01)
*H04L 29/08* (2006.01)

(52) U.S. Cl.
CPC .............. *G08G 1/161* (2013.01); *G08G 1/166* (2013.01); *H04L 67/12* (2013.01)

(58) Field of Classification Search
CPC ............................. G08G 1/166; H04L 67/12
USPC ........ 701/300, 301, 31.4, 32.2, 36, 408, 409
See application file for complete search history.

(56) References Cited

U.S. PATENT DOCUMENTS

| 8,838,383 | B2* | 9/2014 | Stahlin | H04L 67/12 701/484 |
| 2008/0147253 | A1* | 6/2008 | Breed | B60W 30/16 701/3 |
| 2009/0048750 | A1* | 2/2009 | Breed | G08G 1/161 701/70 |
| 2012/0323474 | A1* | 12/2012 | Breed | B60W 30/04 701/117 |
| 2013/0325306 | A1* | 12/2013 | Caveney | B60W 30/0953 701/117 |
| 2014/0210644 | A1* | 7/2014 | Breed | G01S 17/936 340/905 |
| 2015/0294568 | A1* | 10/2015 | Shibata | G08G 1/166 701/465 |

FOREIGN PATENT DOCUMENTS

JP    2000-348299    12/2000

* cited by examiner

*Primary Examiner* — Thomas G Black
*Assistant Examiner* — Wae Louie
(74) *Attorney, Agent, or Firm* — McDermott Will & Emery LLP

(57) ABSTRACT

A first processor derives a first arrival time to be taken for a vehicle and another vehicle travelling straight ahead to intersect at a point. A second processor derives a second arrival time to be taken for the vehicle and the other vehicle running on a straight line linking the vehicle and the other vehicle to encounter at a point. A third processor derives a first range of travelling directions the vehicle can take between the second arrival time and the first arrival time and derives a second range of travelling directions the other vehicle can take between the second arrival time and the first arrival time. A determiner determines relative relation between the vehicle and the other vehicle at a time of intersection between the vehicle and the other vehicle, based on difference between the first range and the second range.

2 Claims, 7 Drawing Sheets

RADIO DEVICE

BACKGROUND

1. Technical Field

The present disclosure relates to a communication technology and particularly to a radio device that receives signals including specified information.

2. Description of the Related Art

Inter-vehicle radio communication devices perform communication among running vehicles and thereby exchange information on the vehicles, such as running conditions. Each inter-vehicle radio communication device receives incoming information signals, detects presence of another vehicle that is expected to reach the vicinity of a predicted destination of the vehicle almost simultaneously with the vehicle, based on the information signals, and gives notice of the presence of detected another vehicle (see Japanese Unexamined Patent Application Publication No. 2000-348299, for instance).

SUMMARY

In Japanese Unexamined Patent Application Publication No. 2000-348299, however, further improvement is required.

In one general aspect, the techniques disclosed here feature a radio device that is mountable on a vehicle, the radio device including a receiver that receives packet signals from another radio device, the packet signals each including at least positional information and yaw rate information on another vehicle on which the other radio device is mounted, an acquirer that acquires positional information and yaw rate information on the vehicle on which the radio device is mounted, a first processor that derives a first arrival time to be taken for the vehicle and the other vehicle travelling straight ahead to intersect at a point, based on the positional information acquired by the acquirer and the positional information included in the packet signals received by the receiver, a second processor that derives a second arrival time to be taken for the vehicle and the other vehicle running on a straight line linking the vehicle and the other vehicle to encounter at a point, based on the positional information acquired by the acquirer and the positional information included in the packet signals received by the receiver, a third processor that derives a first range of travelling directions the vehicle can take between the second arrival time derived by the second processor and the first arrival time derived by the first processor, based on the yaw rate information acquired by the acquirer, and that derives a second range of travelling directions the other vehicle can take between the second arrival time derived by the second processor and the first arrival time derived by the first processor, based on the yaw rate information included in the packet signals received by the receiver, and a determiner that determines relative relation between the vehicle and the other vehicle at a time of intersection between the vehicle and the other vehicle, based on difference between the first range and the second range that are derived by the third processor.

These general and specific aspects may be implemented using a system, a method, and a computer program, and any combination of systems, methods, and computer programs.

According to one aspect described above, further improvement can be attained.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
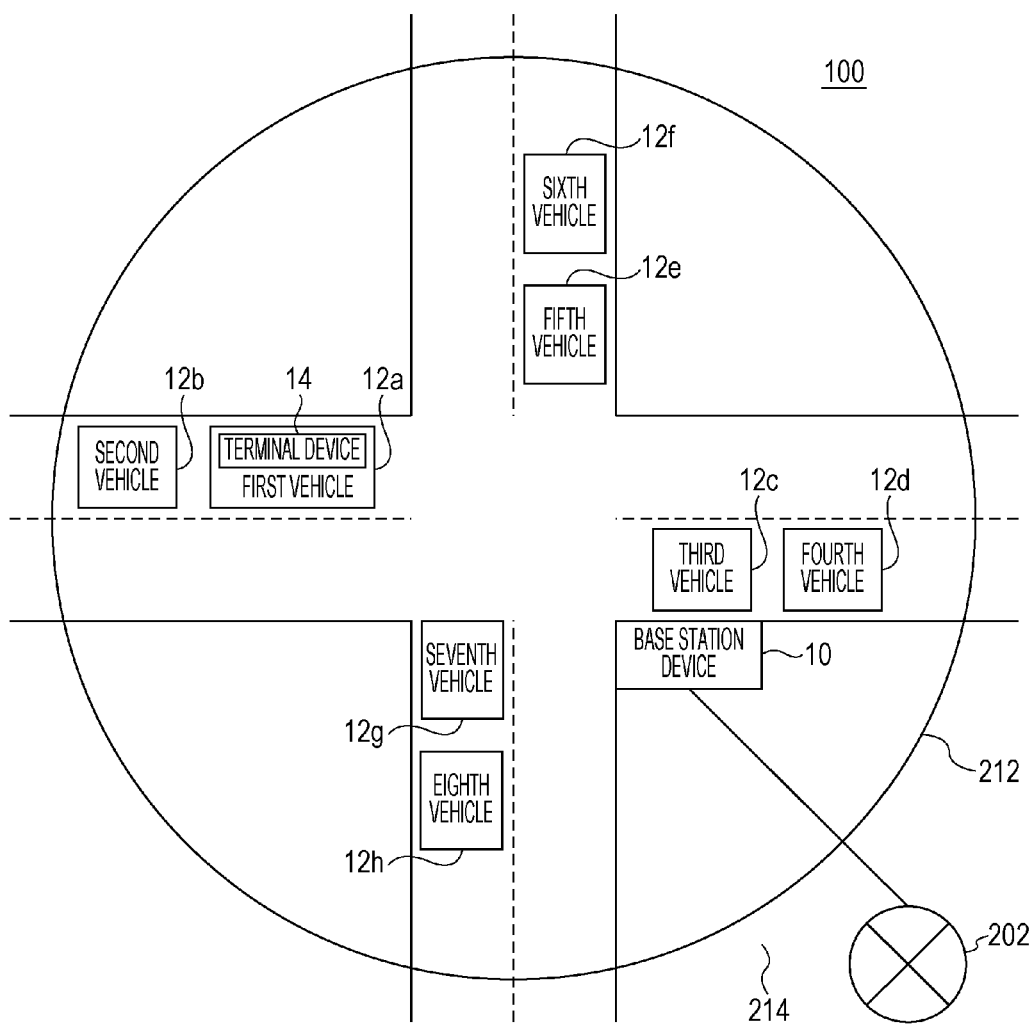
FIG. 1 illustrates a configuration of a communication system according to an embodiment of the disclosure.

Underlying Knowledge Forming Basis of the Present Disclosure

A collision avoidance assistance service between vehicles carries out prediction and determination on collision between vehicles and prompts for collision avoidance by informing a driver of approach of another vehicle, when the collision is predicted. The prediction and determination on the collision is carried out through calculations with use of velocities, positions, and travelling directions of both the vehicles. This method of determination, in which the travelling directions of the vehicles at a time of acquisition of data are used, has a problem in that erroneous determination may be outputted providing a course of a vehicle is bent because of a curve or the like, though the method is effective when the vehicle and another vehicle travel straight ahead.

In order to solve the problem, the inventor examined improvement measures below.

A radio device according to one aspect of the disclosure is mountable on a vehicle and includes a receiver that receives packet signals from another radio device, the packet signals each including at least positional information and yaw rate information on another vehicle on which the other radio device is mounted, an acquirer that acquires positional information and yaw rate information on the vehicle on which the radio device is mounted, a first processor that derives a first arrival time to be taken for the vehicle and the other vehicle travelling straight ahead to intersect at a point, based on the positional information acquired by the acquirer and the positional information included in the packet signals received by the receiver, a second processor that derives a second arrival time to be taken for the vehicle and the other vehicle running on a straight line linking the vehicle and the other vehicle to encounter at a point, based on the positional information acquired by the acquirer and the positional information included in the packet signals received by the receiver, a third processor that derives a first range of travelling directions the vehicle can take between the second arrival time derived by the second processor and the first arrival time derived by the first processor, based on the yaw rate information acquired by the acquirer, and that derives a second range of travelling directions the other vehicle can take between the second arrival time derived by the second processor and the first arrival time derived by the first processor, based on the yaw rate information included in the packet signals received by the receiver, and a determiner that determines relative relation between the vehicle and the other vehicle at a time of intersection between the vehicle and the other vehicle, based on difference between the first range and the second range that are derived by the third processor.

According to the aspect, the relative relation at the time of the intersection is determined based on the first range and the second range that are derived from the first arrival time for the intersection as a result of travelling straight ahead and the second arrival time for the encounter on the straight line and thus estimate accuracy for the intersection between the vehicles can be improved.

In the aspect, the determiner (1) may determine that the relative relation is passing each other, on condition that any of absolute values of the difference is included in a predetermined range with 180 degrees set at center, (2) may determine that the relative relation is travel in the same direction, on condition that any of the absolute values of the difference is included in a predetermined range with zero degrees set at center, or (3) may determine that the relative relation is intersection on other conditions.

According to the aspect, the determination of any one of passing each other, travel in the same direction, and intersection is made based on the difference and thus the relative relation can be determined in detail.

Before specific description on an embodiment of the disclosure, prerequisites therefor will be described initially.

The embodiment of the disclosure relates to a communication system that performs inter-vehicle communication between terminal devices mounted on vehicles and road-to-vehicle communication from a base station device installed at a crossing and the like to the terminal devices. Such communication systems are referred to as Intelligent Transport Systems (ITS). The communication systems use an access control function referred to as Carrier Sense Multiple Access with Collision Avoidance (CSMA/CA), as in a wireless Local Area Network (LAN) complying with standards such as IEEE 802.11. Therefore, the same radio channel is shared among a plurality of terminal devices. In ITS, it is necessary to transmit information to unspecified large number of terminal devices. In order to efficiently carry out such transmission, the present communication system transmits packet signals by broadcasting.

That is, a terminal device transmits packet signals, containing information such as position, velocity, and travelling direction of the vehicle, by broadcasting in the inter-vehicle communication. Other terminal devices receive the packet signals and recognize approach or the like of the vehicle based on the information described above. In order to reduce interference between the road-to-vehicle communication and the inter-vehicle communication, the base station device repetitively specifies a frame including a plurality of sub-frames. The base station device selects any of the plurality of sub-frames for the road-to-vehicle communication and transmits packet signals containing control information and the like by broadcasting in a period of the front part of the selected sub-frame.

The control information includes information on a period (hereinafter referred to as "road-to-vehicle transmission period") in which the base station device transmits the packet signals by broadcasting. The terminal devices identify the road-to-vehicle transmission period based on the control information and transmit packet signals by broadcasting in a CSMA method in periods (hereinafter referred to as "inter-vehicle transmission periods") other than the road-to-vehicle transmission period. As a result, the road-to-vehicle communication and the inter-vehicle communication are time-multiplexed. Terminal devices that fail to receive the control information from the base station device, namely, the terminal devices that are out of an area formed by the base station device transmit packet signals in the CSMA method irrespective of configuration of the frame.

Under such circumstances, a terminal device according to the embodiment is intended to accurately determine intersection between a vehicle (hereinafter may be referred to as "the vehicle") on which the terminal device is mounted and another vehicle (hereinafter may be referred to as "the other vehicle") on which another terminal device is mounted. In particular, the terminal device determines relative relation at a time of intersection with another vehicle without storing road information that designates road shape in order to simplify configuration of the terminal device. The relative relation designates passing each other, travel in the same direction, or other manners of intersection.

The terminal device determines whether the vehicle is to intersect with the other vehicle, based on position, velocity, and travelling direction of the vehicle and position, velocity, and travelling direction of the other vehicle. In a case where the vehicles are to intersect, the terminal device derives time Ta to be taken for the vehicle travelling straight ahead to arrive at an intersection point and time Tb to be taken for the other vehicle travelling straight ahead to arrive at the intersection point and sets the longer of Ta and Tb to be Tc. The terminal device further calculates time Td to be taken for the vehicle and the other vehicle to encounter each other on assumption that the vehicle and the other vehicle travel on a straight line linking the vehicle and the other vehicle. The terminal device further calculates travelling directions the vehicles can take between Td and Tc based on yaw rates of the vehicle and the other vehicle. Based on difference between the travelling directions (relative angles between the travelling directions of the vehicles), the terminal device determines which of passing each other, travel in the same direction, and other manners of intersection is to occur.

FIG. 1 illustrates a configuration of a communication system 100 according to the embodiment of the disclosure. The configuration represents one crossing as seen when looking from above. The communication system 100 includes a base station device 10, a first vehicle 12a, a second vehicle 12b, a third vehicle 12c, a fourth vehicle 12d, a fifth vehicle 12e, a sixth vehicle 12f, a seventh vehicle 12g, an eighth vehicle 12h, the vehicles generally referred to as vehicles 12, and a network 202. A terminal device 14 is mounted on each of the vehicles 12, though the terminal device 14 is given only for the first vehicle 12a in FIG. 1. An area 212 is defined around the base station device 10 and an outside area 214 is defined outside the area 212.

As illustrated in FIG. 1, a road extending in the horizontal direction in the drawing, that is, the left-right direction and a road extending in the vertical direction in the drawing, that is, the up-down direction intersect in a center part. In FIG. 1, upper, left, lower, and right sides correspond to directions of "north", "west", "south", and "east", respectively. A part where the two roads intersect is referred to as a "crossing". The first vehicle 12a and the second vehicle 12b are travelling from the left side to the right side and the third vehicle 12c and the fourth vehicle 12d are travelling from the right side to the left side. The fifth vehicle 12e and the sixth vehicle 12f are travelling from the upper side to the lower side and the seventh vehicle 12g and the eighth vehicle 12h are travelling from the lower side to the upper side.

In the communication system 100, the base station device 10 is fixedly installed at the crossing. The base station device 10 controls communication among the terminal devices. The base station device 10 repetitively generates a frame including a plurality of sub-frames, based on signals received from a Global Positioning System (GPS) satellite not illustrated or frames generated by another base station device 10 not illustrated. A specification is provided that makes it possible to set the road-to-vehicle transmission period in the front part of each sub-frame.

The base station device 10 selects a sub-frame in which no road-to-vehicle transmission period is set by other base station devices 10 from among the plurality of sub-frames in the frame. The base station device 10 sets the road-to-vehicle transmission period in the front part of the selected sub-frame. The base station device 10 broadcasts packet signals in the road-to-vehicle transmission period that has been set. A plurality of packet signals may be broadcasted in the road-to-vehicle transmission period. In the packet signals, accident information, traffic congestion information, traffic signal information, and/or the like are included, for instance. Information on timing in which the road-to-vehicle transmission period is set and the control information on frames are also included in the packet signals.

The terminal devices 14 are movable because being mounted on the vehicles 12, as described above. Upon reception of the packet signals from the base station device 10, the terminal device 14 estimates that the terminal device 14 is in the area 212. When being in the area 212, the terminal device 14 generates a frame, based on the control information included in the packet signals, in particular, the information on the timing in which the road-to-vehicle transmission period is set and the information on the frames. As a result, the frame generated in each of the plurality of terminal devices 14 synchronizes with the frame generated in the base station device 10. The terminal device 14 broadcasts the packet signals in the inter-vehicle transmission period that is different from the road-to-vehicle transmission period. The CSMA/CA is carried out in the inter-vehicle transmission period. When the terminal device 14 estimates that the terminal device 14 is in the outside area 214, the terminal device 14 broadcasts the packet signals by carrying out the CSMA/CA irrespective of the configuration of the frame. Based on the packet signals from another terminal device 14, the terminal device 14 recognizes intersection with another vehicle 12 on which the other terminal device 14 is mounted and determines the relative relation at the time of the intersection. Details of such determination will be described later.

Figure 2:
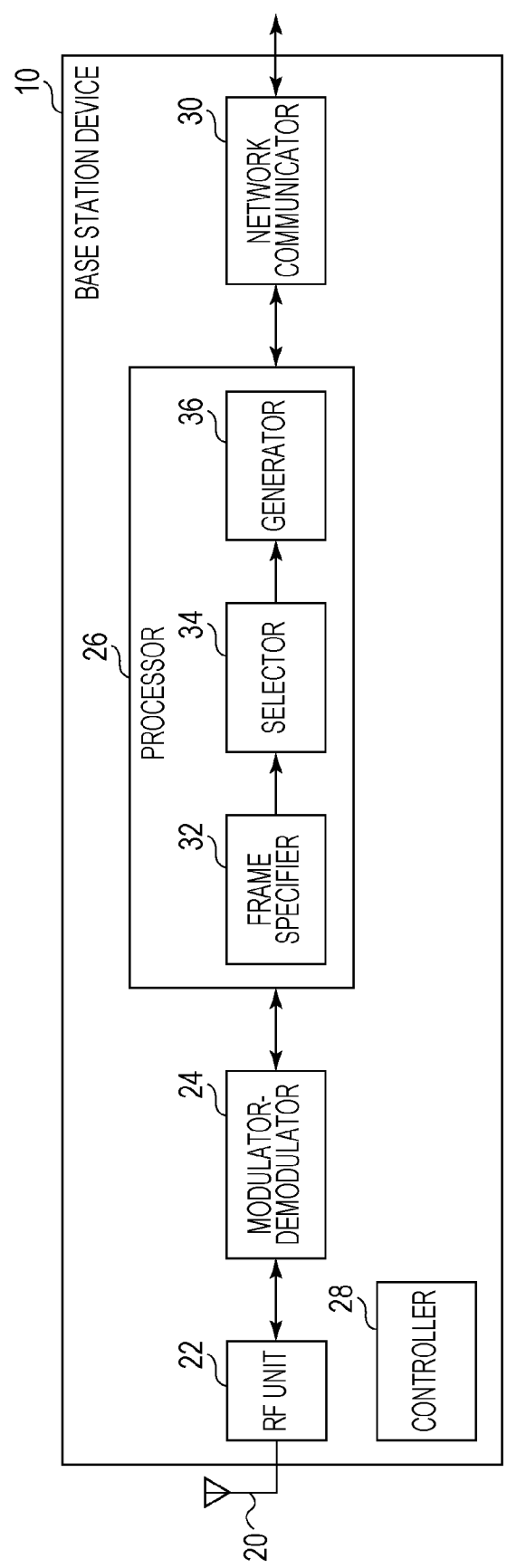
FIG. 2 illustrates a configuration of a base station device in FIG. 1.

FIG. 2 illustrates a configuration of the base station device 10. The base station device 10 includes an antenna 20, an RF unit 22, a modulator-demodulator 24, a processor 26, a controller 28, and a network communicator 30. The processor 26 includes a frame specifier 32, a selector 34, and a generator 36.

The RF unit 22 receives the packet signals from the terminal devices 14 or other base station devices 10 that are not illustrated, by the antenna 20 in reception processing. The RF unit 22 carries out frequency conversion for the received packet signals with radio frequencies and thereby generates baseband packet signals. The RF unit 22 further outputs the baseband packet signals to the modulator-demodulator 24. Though two signal lines should be illustrated for the baseband packet signals, which are generally composed of in-phase component and quadrature component, only one signal line is illustrated herein in order to simplify the drawing. The RF unit 22 includes a Low Noise Amplifier (LNA), a mixer, an AGC, and an AID converter.

The RF unit 22 carries out frequency conversion for baseband packet signals inputted from the modulator-demodulator 24 and thereby generates packet signals with radio frequencies in transmission processing. In the road-to-vehicle transmission period, the RF unit 22 transmits the packet signals with radio frequencies from the antenna 20. The RF unit 22 further includes a Power Amplifier (PA), a mixer, and a DSA converter.

The modulator-demodulator 24 carries out demodulation for the baseband packet signals from the RF unit 22 in the reception processing. The modulator-demodulator 24 outputs a result of the demodulation to the processor 26. The modulator-demodulator 24 carries out modulation for data from the processor 26 in the transmission processing. The modulator-demodulator 24 outputs a result of the modulation as baseband packet signals to the RF unit 22. The communication system 100 supports Orthogonal Frequency Division Multiplexing (OFDM) modulation technique. Therefore, the modulator-demodulator 24 carries out Fast Fourier Transform (FFT) as well, as reception processing, and carries out Inverse Fast Fourier Transform (IFFT) as the transmission processing.

The frame specifier 32 receives signals from a GPS satellite not illustrated and acquires time information based on the received signals. For acquisition of the time information, a known technology may be used and thus description thereon is omitted. The frame specifier 32 generates a plurality of frames based on the time information. For instance, the frame specifier 32 generates ten frames of "100 msec" by dividing a period of "1 sec" into ten periods based on timing designated in the time information. A specification is provided so that the frame is iterated by iteration of such processing. The frame specifier 32 may detect the control information from the result of the demodulation and may generate the frames based on the detected control information. Such processing corresponds to generation of the frames synchronized with the timing of the frames generated by another base station device 10.

Figure 3:
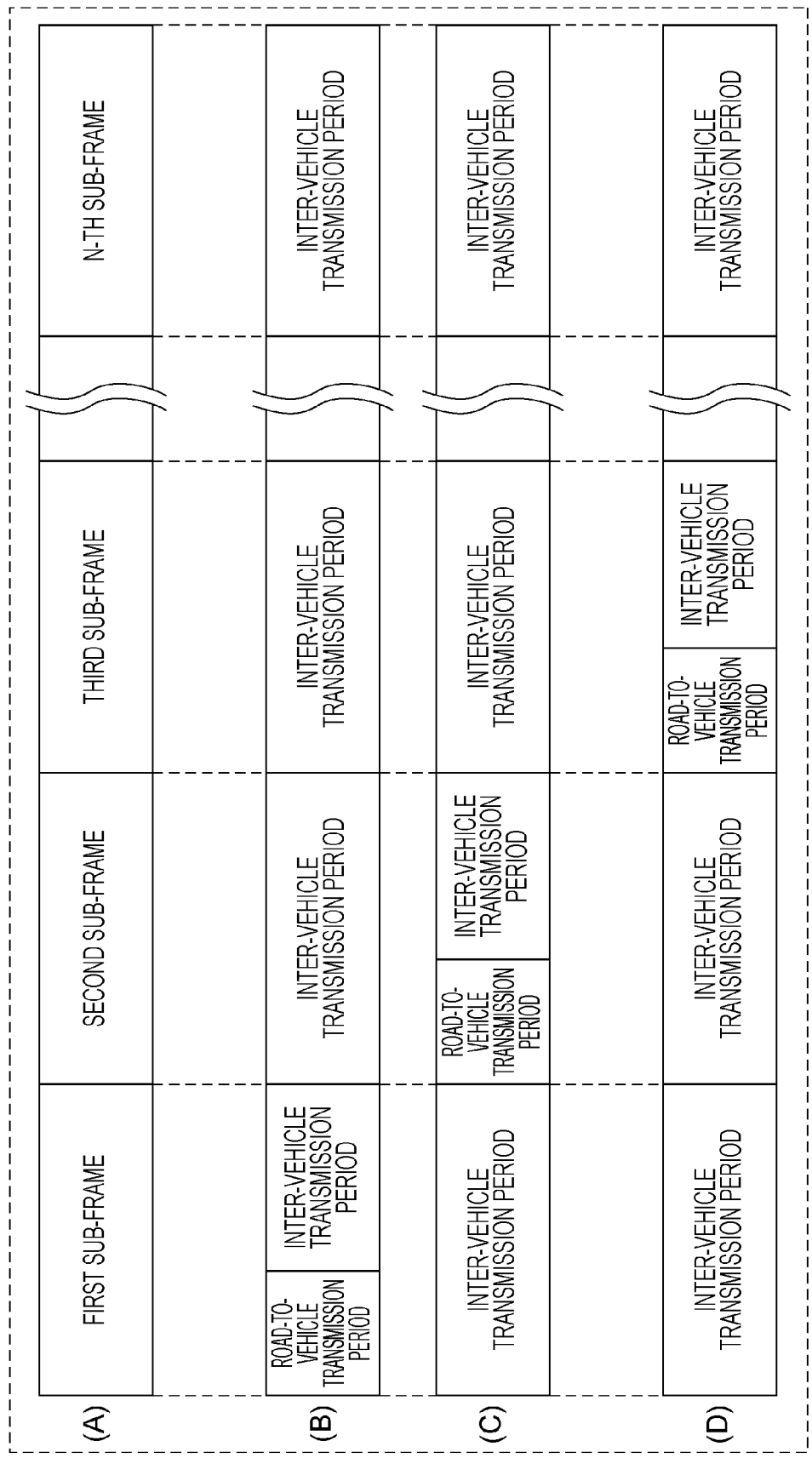
FIG. 3 illustrates a format of a frame specified in the communication system in FIG. 1.

FIG. 3 illustrates formats of frames specified in the communication system 100. FIG. 3(A) illustrates a configuration of a frame. The frame is formed of N sub-frames that are referred to as first to Nth sub-frames. It can be said that the frame is formed by time-multiplexing a plurality of sub-frames that can be used for broadcasting by the terminal device 14. Under conditions of a frame length of 100 msec and N=8, for instance, the sub-frames with the length of 12.5 msec are specified. N may have a value other than 8. Description on FIGS. 3B through 3D will be given later and reference to FIG. 2 is made again.

The selector 34 selects a sub-frame in which the road-to-vehicle transmission period is to be set from among the plurality of sub-frames included in the frame. In specific description, the selector 34 accepts the frame specified by the frame specifier 32. The selector 34 accepts an instruction on the selected sub-frame through an interface not illustrated. The selector 34 selects the sub-frame in accordance with the instruction. Aside from this, the selector 34 may automatically select a sub-frame. At that time, the results of the demodulation from other base station devices 10 or the terminal devices 14 that are not illustrated are inputted into the selector 34 through the RF unit 22 and the modulator-demodulator 24. The selector 34 extracts the results of the demodulation from other base station devices 10 from the inputted results of the demodulation. The selector 34 identifies sub-frames for which the results of the demodulation are not accepted by identifying sub-frames for which the results of the demodulation are accepted.

This corresponds to identification of sub-frames in which no road-to-vehicle transmission period is set by other base station devices 10, that is, to identification of unused sub-frames. When there are a plurality of sub-frames that are unused, the selector 34 selects one sub-frame at random. When there are no sub-frames that are unused, that is, when each of the plurality of sub-frames is used, the selector 34 acquires reception power corresponding to the results of the demodulation and preferentially selects a sub-frame with low reception power.

FIG. 3(B) illustrates a configuration of a frame generated by a first base station device 10a not illustrated. The first base station device 10a sets the road-to-vehicle transmission period in the front part of the first sub-frame. The first base station device 10a sets the inter-vehicle transmission period subsequently to the road-to-vehicle transmission period in the first sub-frame. The inter-vehicle transmission period is a period in which the terminal device 14 is capable of broadcasting the packet signals. That is, a specification is made such that the first base station device 10a can broadcast the packet signals in the road-to-vehicle transmission period which is the first period in the first sub-frame and such that the terminal device 14 can broadcast the packet signals in the inter-vehicle transmission periods other than the road-to-vehicle transmission period in the first sub-frame. The first base station device 10a sets only the inter-vehicle transmission periods in the second to N-th sub-frames.

FIG. 3(C) illustrates a configuration of a frame generated by a second base station device 10b not illustrated. The second base station device 10b sets the road-to-vehicle transmission period in the front part of the second sub-frame. The second base station device 10b sets the inter-vehicle transmission periods in the stage subsequent to the road-to-vehicle transmission period in the second sub-frame, the first sub-frame, and the third to N-th sub-frames. FIG. 3(D) illustrates a configuration of a frame generated by a third base station device 10c not illustrated. The third base station device 10c sets the road-to-vehicle transmission period in the front part of the third sub-frame. The third base station device 10c sets the inter-vehicle transmission periods in the stage subsequent to the road-to-vehicle transmission period in the third sub-frame, the first sub-frame, the second sub-frame, and the fourth to N-th sub-frames. Thus the plurality of base station devices 10 select different sub-frames and set the road-to-vehicle transmission periods in the front parts of the selected sub frames. Reference to FIG. 2 is made again. The selector 34 outputs the number of the selected sub-frame to the generator 36.

The generator 36 accepts the number of the sub-frame from the selector 34. The generator 36 sets the road-to-vehicle transmission period in the sub-frame corresponding to the accepted sub-frame number and generates packet signals that are to be broadcasted in the road-to-vehicle transmission period. In a case where a plurality of packet signals are transmitted in one road-to-vehicle transmission period, the generator 36 generates the packet signals. The packet signals are each composed of the control information and a payload. The control information includes the number of the sub-frame in which the road-to-vehicle transmission period has been set, and the like. The payload includes accident information, traffic congestion information, traffic signal information, and/or the like, for instance. Those data are acquired by the network communicator 30 through the network 202 not illustrated. The processor 26 makes the modulator-demodulator 24 and the RF unit 22 transmit the packet signals by broadcasting in the road-to-vehicle transmission period. The controller 28 controls processing for the whole base station device 10.

This configuration may be implemented by CPUs of any desired computers, memories, and/or other LSIs in hardware and is implemented by programs loaded into memories or the like in software. Herein, functional blocks implemented with cooperation between those are illustrated. It is therefore to be understood by those skilled in the art that the functional blocks may be implemented in various manners by only hardware or combination of hardware and software.

Figure 4:
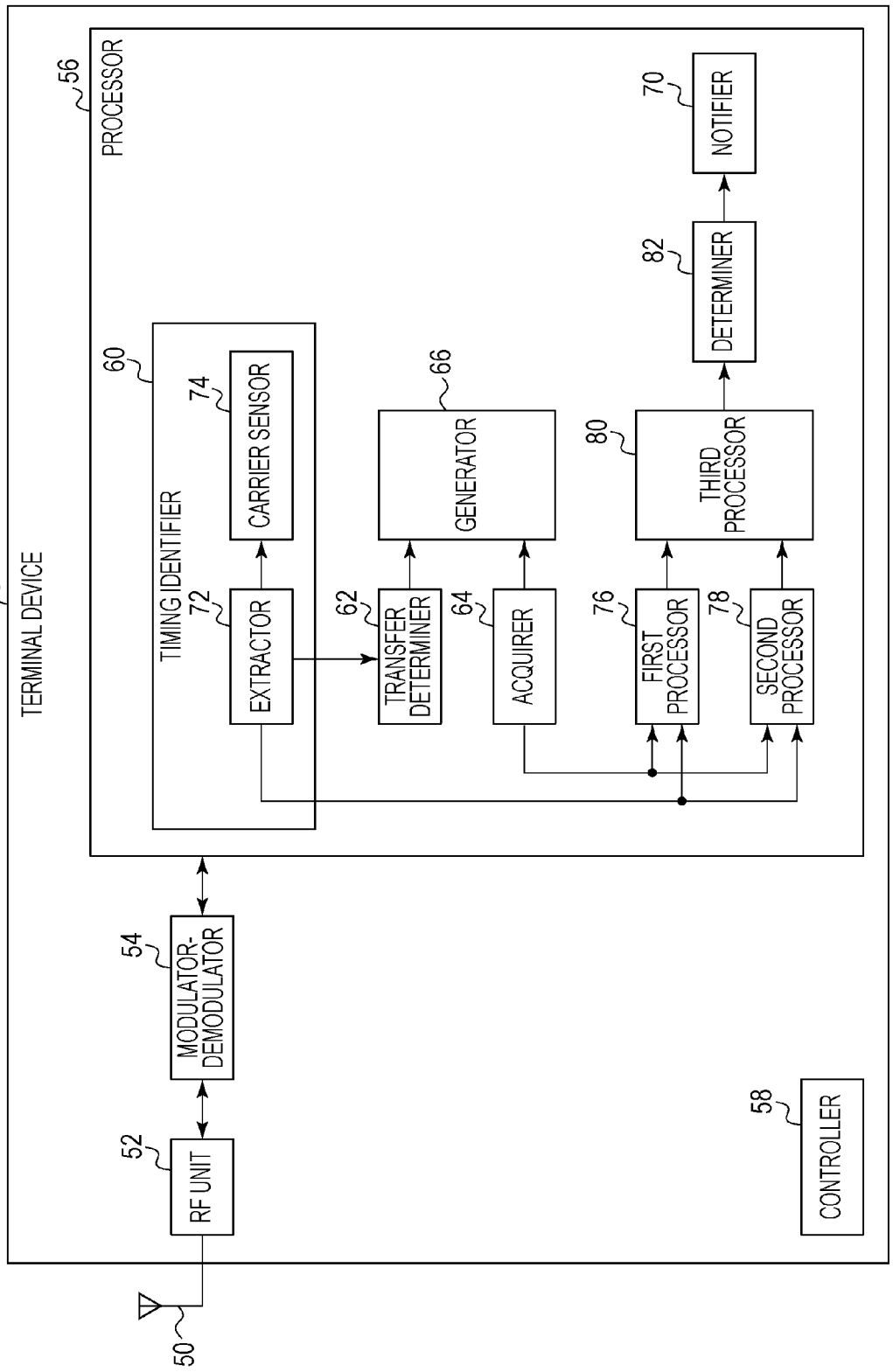
FIG. 4 illustrates a configuration of a term terminal device in FIG. 1.

FIG. 4 illustrates a configuration of the terminal device 14. The terminal device 14 includes an antenna 50, an RF unit 52, a modulator-demodulator 54, a processor 56, and a controller 58. The processor 56 includes a timing identifier 60, a transfer determiner 62, an acquirer 64, a generator 66, a first processor 76, a second processor 78, a third processor 80, a determiner 82, and a notifier 70. The timing identifier 60 includes an extractor 72 and a carrier sensor 74. The terminal devices 14 may be mounted on the vehicles 12, as described above. The antenna 50, the RF unit 52, and the modulator-demodulator 54 carry out the same processing that the antenna 20, the RF unit 22, and the modulator-demodulator 24 in FIG. 2 carry out. Description herein is given mainly on difference therebetween.

The modulator-demodulator 54 and the processor 56 receive packet signals from other terminal devices 14 or base station devices 10 that are not illustrated in reception processing. As described above, the modulator-demodulator 54 and the processor 56 receive the packet signals from the base station device 10 in the road-to-vehicle transmission period and receive the packet signals from another terminal device 14 in the inter-vehicle transmission period. The packet signals from another terminal device 14 include at least position, travelling direction, travel velocity, and the like (hereinbelow generally referred to as "positional information") of another vehicle 12 on which the other terminal device 14 is mounted. The packet signals further include yaw rate information of another vehicle 12. The yaw rate is a rate of change in a yaw angle and is a turning angle velocity around a vertical axis that passes through the center of gravity of the vehicle 12. The yaw ate, along with lateral acceleration, defines gyrating movement. The yaw rate is measured by a rate gyro. The yaw angle is obtained by integration of the yaw rate. For acquisition of the positional information and the yaw rate information on another terminal device 14, known technologies may be used and thus description thereon is omitted.

In a case where the results of the demodulation from the modulator-demodulator 54 are the packet signals from the base station device 10 not illustrated, the extractor 72 identifies timing of the sub-frame in which the road-to-vehicle transmission period has been allocated. At that time, the extractor 72 estimates that the terminal device 14 is in the area 212 in FIG. 1. The extractor 72 generates a frame, based on the timing of the sub-frame and content of the message header of the packet signals, specifically, content of the time length of the road-to-vehicle transmission period. The frame may be generated as in the frame specifier 32 described above and thus description thereon is omitted. As a result, the extractor 72 generates the frame synchronized with the frame generated by the base station device 10.

When the broadcast source of the packet signals is another terminal device 14, the extractor 72 omits processing of generating the synchronized frame, extracts the positional information and the yaw rate information included in the packet signals, and outputs the positional information and the yaw rate information to the first processor 76 and the second processor 78.

When receiving no packet signals from the base station device 10, the extractor 72 estimates that the terminal device 14 is in the outside area 214 in FIG. 1. The extractor 72 estimating that the terminal device 14 is in the area 212 selects the inter-vehicle transmission period. The extractor 72 estimating that the terminal device 14 is in the outside area 214 selects timing having nothing to do with the configuration of the frame. The extractor 72 having selected the inter-vehicle transmission period outputs information on the timing of the frame and the sub-frames and the inter-vehicle transmission period to the carrier sensor 74. The extractor 72 having selected the timing that has nothing to do with the configuration of the frame instructs the carrier sensor 74 to carry out carrier sense.

The carrier sensor 74 accepts the information on the timing of the frame and the sub-frames and the inter-vehicle transmission period from the extractor 72. The carrier sensor 74 determines transmission timing by starting CSMA/CA within the inter-vehicle transmission period. When instructed by the extractor 72 to carry out the carrier sense that has nothing to do with the configuration of the frame, the carrier sensor 74 determines the transmission timing by carrying out the CSMA/CA without considering the configuration of the frame. The carrier sensor 74 notifies the modulator-demodulator 54 and the RF unit 52 of the determined transmission timing and makes the modulator-demodulator 54 and the RF unit 52 transmit packet signals by broadcasting.

The transfer determiner 62 controls transfer of the control information. The transfer determiner 62 extracts information that may be transferred, from the control information. The transfer determiner 62 generates information to be transferred, based on the extracted information. Description on this processing is omitted. The transfer determiner 62 outputs the information to be transferred, that is, a portion of the control information to the generator 66.

The acquirer 64 includes a GPS receiver, a gyroscope, a vehicle speed sensor, and the like that are not illustrated and acquires position, travelling direction, travel velocity, and the like (generally referred to as "positional information" as described above) of the vehicle 12 not illustrated, that is, the vehicle 12 on which the terminal device 14 is mounted, from data supplied from the GPS receiver, the gyroscope, the vehicle speed sensor, and the like. The position is designated by latitude and longitude. The travelling direction is designated by an azimuth angle that is measured with north used as reference azimuth (zero degrees) and with a clockwise angle represented as positive. For acquisition of the information, known technologies may be used and thus description thereon is omitted. The acquirer 64 includes the rate gyro not illustrated and acquires the yaw rate information on the vehicle 12 on which the terminal device 14 is mounted, from data supplied from the rate gyro. The acquirer 64 outputs the positional information and the yaw rate information to the generator 66, the first processor 76, and the second processor 78.

The generator 66 accepts the positional information and the yaw rate information from the acquirer 64 and accepts the portion of the control information from the transfer determiner 62. The generator 66 generates packet signals including the information and transmits the generated packer signals by broadcasting through the modulator-demodulator 54, the RF unit 52, and the antenna 50 at the transmission timing determined by the carrier sensor 74. This operation corresponds to the inter-vehicle communication.

Figure 5:
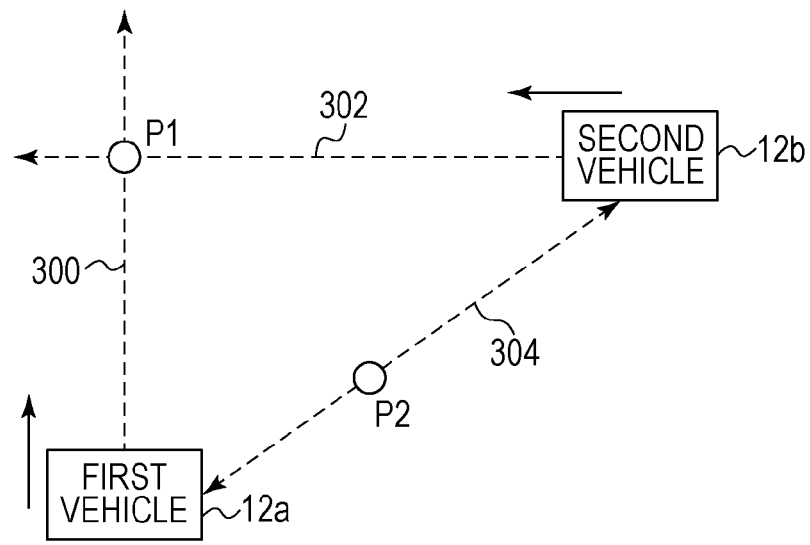
FIG. 5 illustrates outline of processing in a first processor and a second processor in FIG. 4.

The first processor 76 accepts the positional information and the yaw rate information from the acquirer 64 and accepts the positional information and the yaw rate information from the extractor 72. The first processor 76 derives a route (hereinafter referred to as "the vehicle route") for the vehicle that travels straight ahead in the travelling direction from the current position thereof, based on the positions and the travelling direction in the positional information acquired from the acquirer 64. On the other hand, the first processor 76 derives a route (hereinafter referred to as "the other-vehicle route") for the other vehicle that travels straight ahead in the travelling direction from the current position thereof, based on the positions and the travelling direction in the positional information acquired from the extractor 72. FIG. 5 illustrates outline of processing in the first processor 76 and the second processor 78. The first vehicle 12a corresponds to the vehicle described above and the second vehicle 12b corresponds to the other vehicle described above. A route of the first vehicle 12a that travels straight ahead is the vehicle route 300 and a route of the second vehicle 12b that travels straight ahead is the other-vehicle route 302. Reference to FIG. 4 is made again.

Subsequently, the first processor 76 determines whether the vehicle route 300 and the other-vehicle route 302 intersect each other or not. In a case in FIG. 5, the vehicle route 300 and the other-vehicle route 302 intersect each other at an intersection point P1. In a case where the routes intersect each other, the first processor 76 derives the time Ta to be taken for the first vehicle 12a to arrive at the intersection point P1 by dividing distance from the position of the first vehicle 12a to the intersection point P1 along the vehicle route 300 by the travel velocity of the first vehicle 12a. The first processor 76 further derives the time Tb to be taken for the second vehicle 12b to arrive at the intersection point P1 by dividing distance from the position of the second vehicle 12b to the intersection point P1 along the other-vehicle route 302 by the travel velocity of the second vehicle 12b.

The first processor 76 makes a comparison between the time Ta and the time Tb and selects the longer. The selected time is set as first arrival time Tc. It can be said that the first arrival time Tc is a time derived based on the positional information acquired by the acquirer 64 and the positional information included in the packet signals received by the modulator-demodulator 54 and is a time to be taken for the vehicle and the other vehicle travelling straight ahead to arrive at the intersection point. The first processor 76 outputs the first arrival time Tc to the third processor 80. In a case where the routes do not intersect each other, the first processor 76 ends the processing.

The second processor 78 accepts the positional information and the yaw rate information from the acquirer 64 and accepts the positional information and the yaw rate information from the extractor 72. The second processor 78 derives the straight line (hereinafter referred to as "shortest route") linking the vehicle and the other vehicle. In FIG. 5, the straight line is represented as the shortest route 304. The second processor 78 derives second arrival time Td to be taken for the vehicle and the other vehicle to encounter each other at an encounter point P2 by dividing distance of the shortest route by sum of the travel velocity of the vehicle and the travel velocity of the other vehicle. It can be said that the second arrival time Td is a time derived based on the positional information acquired by the acquirer 64 and the positional information included in the packet signals received by the modulator-demodulator 54 and is a time to be taken for the vehicle and the other vehicle travelling on the straight line linking the vehicle and the other vehicle to arrive at the encounter point. The second processor 78 outputs the second arrival time Td to the third processor 80. On condition that the processing has been ended in the first processor 76, the second processor 78 does not carry out the processing.

The third processor 80 accepts the first arrival time Tc from the first processor 76 and accepts the second arrival time Td from the second processor 78. The third processor 80 derives a first range of the travelling direction the vehicle can take, between the second arrival time Td and the first arrival tune Tc, based on the yaw rate information on the vehicle that is acquired by the acquirer 64. The third processor 80 also derives a second range of the travelling direction the other vehicle can take, between the second arrival time Td and the first arrival time Tc, based on the yaw rate information on the other vehicle that is included in the packet signals received by the modulator-demodulator 54.

Figure 6A:
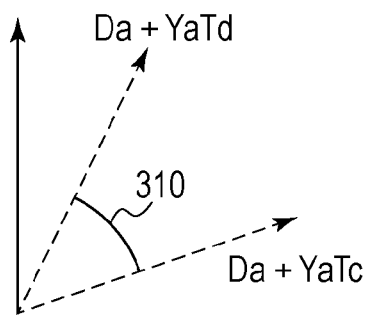
FIG. 6A illustrates outline of processing in a third processor in FIG. 4.
Figure 6B:
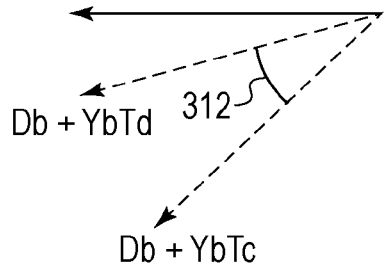
FIG. 6B illustrates outline of processing in the third processor in FIG. 4.

FIGS. 6A and 6B illustrate outline of processing in the third processor 80, FIG. 6A illustrates outline of processing for deriving the first range 310 of the travelling direction (azimuth angle) the vehicle can take. The travelling direction of the vehicle is designated by Da and the yaw rare information on the vehicle is designated by Ya. The third processor 80 calculates Da+YaTd and Da+YaTc. As illustrated in FIG. 6A, an angle between Da+YaTd and Da+YaTc corresponds to the first range 310. FIG. 6B illustrates outline of processing for deriving the second range 312 of the travelling direction (azimuth angle) the other vehicle can take. The travelling direction of the other vehicle is designated by Db and the yaw rate information on the other vehicle is designated by Yb. The third processor 80 calculates Db+YbTd and Db+YbTc. As illustrated in FIG. 6B, an angle between Db+YbTd and Db+YbTc corresponds to the second range 312. Reference to FIG. 4 is made again. The third processor 80 outputs information on the first range 310 and information on the second range 312 to the determiner 82.

The determiner 82 accepts the information on the first range 310 and the information on the second range 312 from the third processor 80. The determiner 82 calculates difference between the first range 310 and the second range 312. hi specific description, the determiner 82 calculates the difference ranging from a minimum value to a maximum value of a relative angle between the vehicles, from a difference in the azimuth angle between the first range 310 and the second range 312, based on a minimum value and a maximum value of the azimuth angles included in the first range 310 and a minimum value and a maximum value of the azimuth angles included in the second range 312. Herein, the difference between the maximum value in the first range 310 and the maximum value in the second range 312, the difference between the maximum value in the first range 310 and the minimum value in the second range 312, the difference between the minimum value in the first range 310 and the maximum value in the second range 312, and the difference between the minimum value in the first range 310 and the minimum value in the second range 312 are calculated. The determiner 82 selects the minimum value and the maximum value of the difference from among results of the calculation. The determiner 82 determines the relative relation at the time of the intersection of the vehicle and the other vehicle by comparison between the difference in the azimuth angle and a criterion for the determination.

Figure 7:
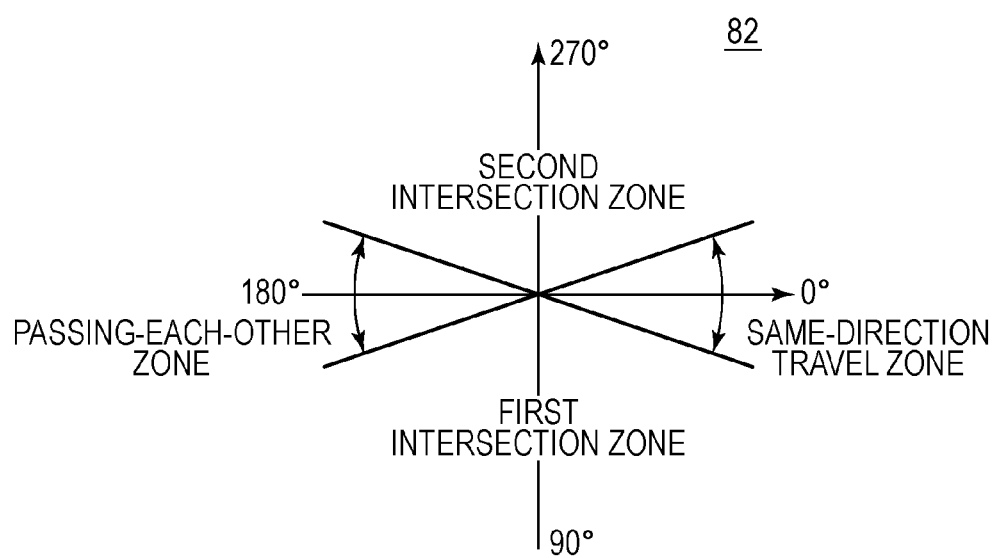
FIG. 7 illustrates a criterion for determination in a determiner in FIG. 4.

FIG. 7 illustrates the criterion for the determination in the determiner 82. As illustrated, zero degrees is specified in a rightward direction and 90, 180, and 270 degrees are specified in the clockwise manner. Marking 360 degrees results in a return to zero degrees. A predetermined range with 180 degrees set at the center is specified as a "passing-each-other zone" and a predetermined range with zero degrees set at the center is specified as a "same-direction travel zone". The predetermined ranges are each set as ±15 degrees, for instance. The predetermined range for the passing-each-other zone and the predetermined range for the same-direction travel zone may have different values. In zones other than the passing-each-other zone and the same-direction travel zone, a zone including 90 degrees is specified as a first intersection zone and a zone including 270 degrees is specified as a second intersection zone.

On condition that absolute values of the difference include a value in the passing-each-other zone, the determiner 82 determines that the relative relation is passing each other. The difference has a range including the minimum value and the maximum value of the relative angle between the vehicles and it is thus determined whether any of the values in the range is included or not in the passing-each-other zone. Determination below is carried out in a similar manner. On condition that the absolute values of the difference include a value in the same-direction travel zone, the determiner 82 determines that the relative relation is travel in the same direction. On other conditions, that is, on condition that all the absolute values of the difference are included in the first intersection zone or the second intersection zone, the determiner 82 determines that the relative relation is intersection. Reference to FIG. 4 is made again. The determiner 82 outputs a result of the determination to the notifier 70.

The notifier 70 displays content of received packer signals on a monitor or the like that is not illustrated. The result of the determination from the determiner 82 is inputted into the notifier 70. The notifier 70 notifies a driver of the result of the determination, that is, any one of passing each other, travel in the same direction, and intersection through the monitor or a speaker. The notifier 70 further notifies the driver of information included in the packet signals from the base station device 10 through the monitor or the speaker.

Figure 8:
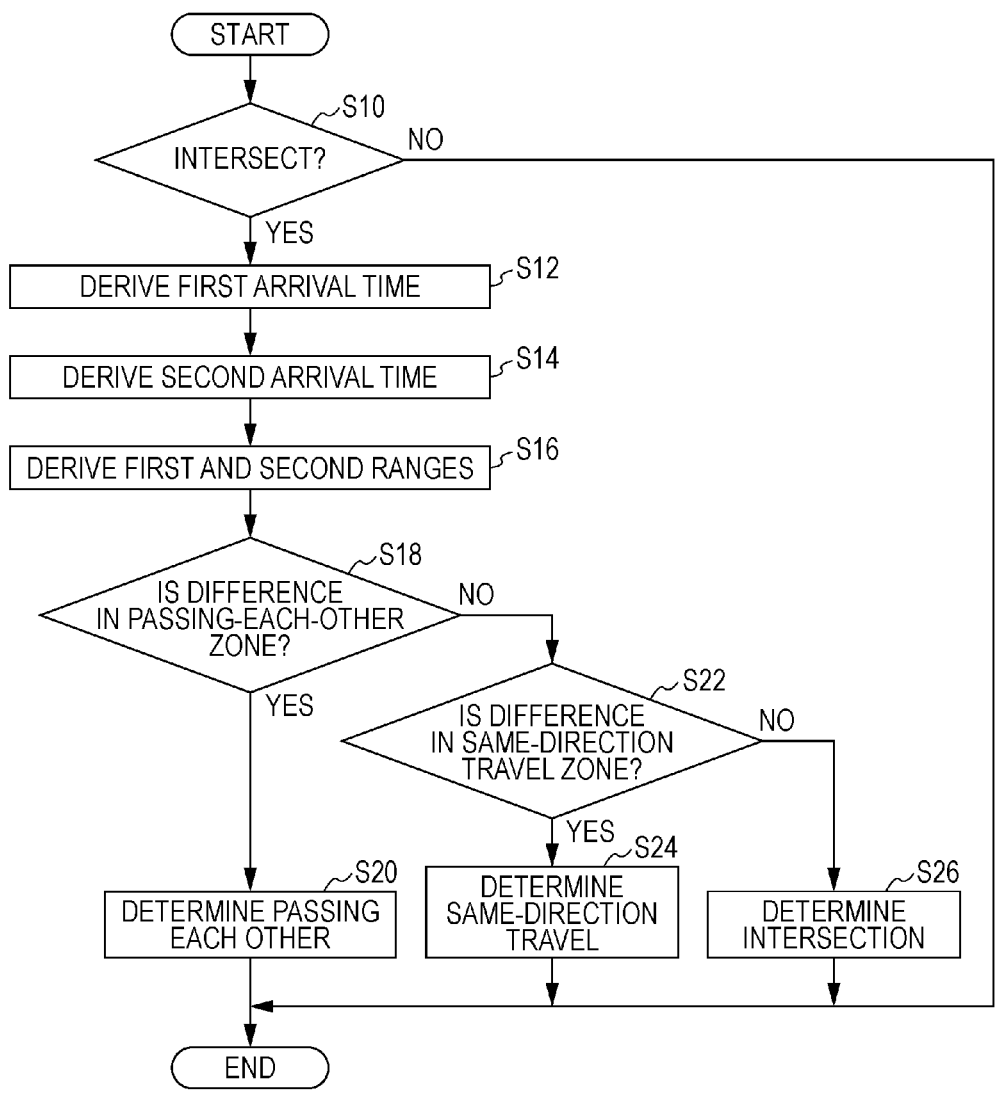
FIG. 8 is a flow chart illustrating procedure of determination by the terminal device in FIG. 4.

Operations of the communication system 100 having the above configurations will be described. FIG. 8 is a flow chart illustrating a procedure of the determination by the terminal device 14. if the vehicles are to intersect (Yes in S10), the first processor 76 derives the first arrival time (S12). The second processor 78 derives the second arrival time (S14). The third processor 80 derives the first range 310 and the second range 312 (S16). If the difference includes a value in the passing-each-other zone (Yes in S18), the determiner 82 determines passing each other (S20). If the difference does not include a value in the passing-each-other zone (No in S18) and if the difference includes a value in the same-direction travel zone (Yes in S22), the determiner 82 determines travel in the same direction (S24). If the difference does not include a value in the same-direction travel zone (No in S22), the determiner 82 determines intersection (S26). If the vehicles are not to intersect (No in S10), the processing is ended.

According to the embodiment of the disclosure, the relative relation at the time of the intersection is determined based on the first range and the second range that are derived from the first arrival time for the intersection as a result of travelling straight ahead and the second arrival time for the encounter on the straight line, and the intersection between the vehicles can be estimated even if no road information is retained. In addition, the relative relation for the intersection is estimated based on the ranges of the angle that may change and thus estimate accuracy for the intersection between the vehicles can be improved. The determination of any one of passing each other, travel in the same direction, and intersection is made based on the difference and thus the relative relation can be determined in detail.

The disclosure has been described above based on the embodiment. It is to be understood by those skilled in the art that the embodiment is given as an example, that various modifications in combination of components or processes thereof may be made, and that such modifications are embraced by the scope of the disclosure.

In the embodiment, the determiner 82 determines any one of passing each other, travel in the same direction, and intersection as the relative relation for the intersection. The determiner 82, however, may determine whether the vehicles are to pass each other or not or whether the vehicles are to travel in the same direction or not, for instance, without limitation thereto. The determiner 82 may determine whether the vehicles are to pass each other or to travel in the same direction or not. According to the modification, the processing in the determiner 82 can be simplified.

Though the first processor 76 ends the processing in a case where the vehicle and the other vehicle do not intersect each other in the embodiment, the processing in the first processor 76 may be ended in a case where the first arrival time Tc exceeds a predetermined time, for instance, in addition to the case where the vehicles do not intersect. According to the modification, a burden of the processing in the determiner 82 can be reduced.

Though the first arrival time Tc is the time to be taken for the vehicle and the other vehicle travelling straight ahead to arrive at the intersection point in the embodiment, the first arrival time Tc may be a time to be taken for the vehicle and the other vehicle travelling straight ahead to arrive at a point where the vehicles are predicted to collide. The prediction of the collision is made on condition that difference between the time Ta and the time Tb is within a predetermined time, for instance. According to the modification, the burden of the processing in the determiner 82 can be reduced. In addition, the relative relation between the vehicles is redetermined based on the range of the angle between the vehicles that may change and thus erroneous determination of the collision that may be caused on condition that courses of the vehicles are bent can be reduced.

What is claimed is:

1. A radio device that is mountable on a vehicle, the radio device comprising:

a receiver that receives packet signals from another radio device, the packet signals each including at least positional information and yaw rate information on another vehicle on which the other radio device is mounted;

an acquirer that acquires positional information and yaw rate information on the vehicle on which the radio device is mounted;

a first processor that derives a first arrival time to be taken for the vehicle and the other vehicle travelling straight ahead to intersect at a point, based on the positional information acquired by the acquirer and the positional information included in the packet signals received by the receiver;

a second processor that derives a second arrival time to be taken for the vehicle and the other vehicle running on a straight line linking the vehicle and the other vehicle to encounter at a point, based on the positional information acquired by the acquirer and the positional information included in the packet signals received by the receiver;

a third processor that derives a first range of travelling directions the vehicle can take between the second arrival time derived by the second processor and the first arrival time derived by the first processor, based on the yaw rate information acquired by the acquirer, and that derives a second range of travelling directions the other vehicle can take between the second arrival time derived by the second processor and the first arrival time derived by the first processor, based on the yaw rate information included in the packet signals received by the receiver; and a determiner that determines relative relation between the vehicle and the other vehicle at a time of intersection between the vehicle and the other vehicle, based on difference between the first range and the second range that are derived by the third processor.

2. The radio device according to claim 1, wherein the determiner (1) determines that the relative relation is passing each other, on condition that any of absolute values of the difference is included in a predetermined range with 180 degrees set at a center, (2) determines that the relative relation is travel in the same direction, on condition that any of the absolute values of the difference is included in a predetermined range with zero degrees set at a center, or (3) determines that the relative relation is intersection on other conditions.

* * * * *